No. 748,738. PATENTED JAN. 5, 1904.
E. HUDSON.
ENGINE GOVERNOR.
APPLICATION FILED SEPT. 8, 1902.
NO MODEL.
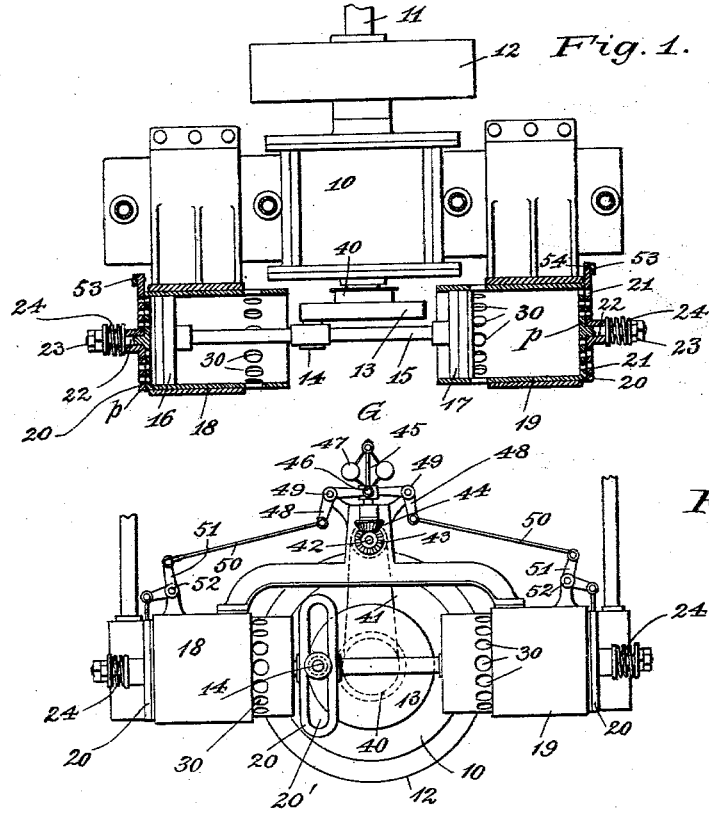
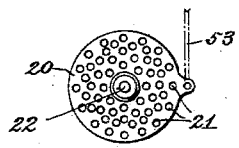
Witnesses:
Raymond W. Hevenor.
J. J. Looney.
Inventor:
E. Hudson,
By his Attorney
Chas. F. Schmelz No. 748,738.

Patented January 5, 1904.

UNITED STATES PATENT OFFICE.

EDMUND HUDSON, OF TEMPLETON, MASSACHUSETTS.

ENGINE-GOVERNOR.

SPECIFICATION forming part of Letters Patent No. 748,738, dated January 5, 1904.

Application filed September 8, 1902. Serial No. 122,450. (No model.)

*To all whom it may concern:*

Be it known that I, EDMUND HUDSON, a citizen of the United States, and a resident of Templeton, in the county of Worcester and State of Massachusetts, have invented certain new and useful Improvements in Engine-Governors, of which the following is a full, clear, and exact specification.

This invention relates to power systems which comprise a motor adapted to run uniformly even; and it has for its object the provision of a device whereby the "load" of the motor may be maintained substantially uniform during the operation or run thereof.
The general practice, as far as known, aims to control the motor speed by varying the energy supplied to the motor proportionately to the torque, or, in other words, to restrict and decrease such energy-supply as the work to be performed decreases, and vice versa, so that the energy-controlling devices will be instrumental directly in varying the energy by increasing or decreasing its amount as the torque of the motor increases or decreases, respectively, thus effecting the regulation of the movement by varying the power-supply.

My present invention has for its aim to effect the regulation of the motor speed through an increase or decrease of the load by a secondary load mechanism instead of varying the energy-supply, so that the motor will at all times work substantially under uniform conditions and the work output will remain practically constant.
It should be stated at this time that it is immaterial when carrying my invention into practice what species of motor may be used, provided that it will be adapted to run evenly under a certain amount of energy and under an even load.

In order to better illustrate the principal aim of my invention, let it be supposed that the motor employed is a steam-engine and that the work to be performed by this engine is to propel a vehicle. It will now be understood that if the engine-governor is so constructed and organized as to limit the speed of the engine to about five hundred revolutions (this speed being assumed properly proportioned to the desired vehicle speed) this engine speed will be maintained by the governor ordinarily acting directly upon the steam-admission valve for varying its point of cut-off, so that, consequently, the steam or energy supply will be varied according to the difficulty with which the vehicle may be propelled.

Now in my invention the governor does not interfere in any manner with the cut-off point of the valve, but is effective in maintaining the engine under a constant load, and for this purpose I provide a secondary load-supply from which the governor may draw according to the speed of the engine, so that, for instance, when the vehicle is moving on a level and consequently little power is required and the engine would naturally tend to increase its speed (since the valve-action remains the same) the governor will practically put a brake into operation so as to maintain the speed substantially constant, thus causing the engine to perform the same amount of work whether the vehicle be going up or down hill or moving on a level or standing still.

The condition explained above will prevail equally, of course, no matter whether the motor be operated by gas, electricity, or any other agent, and it should be understood that the braking mechanism above referred to may be of any suitable construction and organization without in any way avoiding the gist or import of my invention.

In order to explain the particular function and operation of my invention, I have illustrated in the drawings a power system embodying the same, and in the following specification I will confine myself to the particular form thereof shown.

In the drawings, in which similar characters denote similar parts, Figure 1 represents a top view of a mechanism embodying my invention. Fig. 2 is a front view thereof, and Fig. 3 is an end view of one of the brake-cylinders and its varying device.

In the drawings, 10 denotes a motor, which may be of any suitable construction and actuates the main shaft 11, carrying a fly-wheel 12, as usual. The forward end of the shaft 11 is in the present instance utilized for operating the secondary load-supply mechanism, which comprises a pair of cylinders in which a vacuum of a greater or less magnitude may be established, according to the speed which the motor develops. In this manner the air is rarefied instead of being compressed, and consequently any tendency of heating the mechanism is not only avoided, but rather a tendency of cooling the mechanism on account of such rarefied air is thus created, a condition which is far preferable in actual practice. It should, however, be understood that my invention is not confined primarily to the organization of such "vacuum-brake," as it might be properly named, and that other agents, such as water or oil, which may pass through openings subject to restriction may be imparted in equal facility.

The apparatus shown in the drawings is, as above mentioned, operated directly from the crank-shaft 11, which at its forward end has a disk 13, upon which a crank-pin 14 may be mounted so as to impart a reciprocatory movement to a rod 15, both ends of which have pistons 16 and 17, respectively, operative within suitable cylinders 18 and 19.

From the above description it will be seen that the organization is such as to cause a straight-line reciprocation of the piston-rod 15, which for this reason has its central portion elongated, as at 20, and may have a slot 20′, in which the crank-pin 14 may play during its revolution with the crank-disk 13.

As above stated, the cylinders are preferably operative on the vacuum principle, the vacuum being established at the outer ends of said cylinders, according to the speed of the motor, as will be hereinafter described.

Referring to Fig. 1, it will be seen that the end walls of the cylinders 18 and 19 are provided with a plurality of perforations $p$, through which air may pass during the reciprocation of the pistons in the cylinders, the number of the perforations being sufficient to permit a free movement of the pistons whenever the perforations are open.

Now in order to regulate the admission of air into the cylinder while the piston is traveling inward or toward the crank-shaft and for the purpose of increasing the work which the motor will have to perform means are provided whereby the perforations 21 in the cylinder-heads may be either partly or entirely closed, these means being under the control of a device which is directly operated from the motor and the action of which is dependent upon the speed thereof. The means which I employ in the present instance consist, substantially, of a disk or foraminous cover disposed at the outer sides of the cylinder-heads and rotatably held thereon, so that the apertures in said disk may be caused to register with the perforations $p$, or, on the other hand, when said cover is sufficiently rotated the perforations may be entirely closed. Secured to the ends of the cylinders are studs 22, which serve as journals for the disks 20 and are adapted to receive nuts, such as 23, whereby springs, such as 24, may be compressed for normally retaining said disks against the cylinder-heads during the inward movement of the pistons, while on the other hand if any air should be compressed in the cylinders 18 and 19 during the outward movement of the pistons said disks may be forced away bodily from the cylinder-heads, so as to permit the air contained in the cylinders to pass outward.

From the foregoing description it will be clearly understood that when the perforations $p$ in the cylinder-heads are entirely closed by the disk 20 and the piston is moving inward or toward the crank-shaft a vacuum will be established in the cylinders, the rarefaction of air taking place until the piston 17, for instance, has moved far enough to uncover another series of openings 30, provided in the cylinder-shell and through which air may pass into the cylinder 19, thus destroying the vacuum previously established therein.

It will now be seen that when the piston 17 moves again outward the air contained in the cylinder 19 will be compressed, and will therefore lift the disk 20 from its seat, and thus escape from the cylinder, thus constituting a compression-brake during the outward strike of the piston.

It is of course evident that the conditions as above explained will supply work to the motor, and in order to maintain the total work performed by the motor in a substantially uniform and constant condition means are provided whereby such additional work may be regulated by the motor itself, this result being achieved by shifting the cover around its axis, and thus regulating the amount of opening which the perforations $p$ may have for the required load.

The device which I use in connection with the motor is, as above stated, directly under the control of the motor and consists in the present instance of a governor G, the shaft 11 being provided with a pulley 40, which imparts movement through the intervention of a pulley 41 to a spindle 42, the movement of which is transferred through bevel-gears 43 and 44 to the vertical spindle 45, upon which a collar 46 is mounted for sliding movement and raised or lowered by the centrifugal force of the governor-balls 47 in the usual manner.

In the organization shown the collar 46 is operative upon angle-levers 48, pivoted at 49 and connected through links 50 with another set of angle-levers 51, which are fulcrumed at 52, as shown in Fig. 2. These angle-levers 51 are also connected by links 53 with ears 54, forming a part of and projecting from the disks 20 above mentioned, the entire organization being such that as the governor-balls 47 rise the disk 20 will be rotated to close the perforations $p$ in the cylinder-heads, so that in reality the cylinders 18 and 19 constitute a brake mechanism for keeping the motor running under a constant and practically even speed.

Having described my invention, what I claim as new, and desire to secure by Letters Patent, is—

1. The combination, with a motor; of a vacuum-brake for supplying load to the motor inversely to its torque.

2. The combination, with a motor; of a vacuum-brake; and means for variably controlling the vacuum.

3. The combination, with a motor; a vacuum-cylinder; and a piston operative therein and operated by said motor; of means for variably controlling the vacuum.

4. The combination, with a motor; and a cylinder having a series of perforations leading from the inside to the outside thereof; of a member, having similar perforations; and means for shifting said member to regulate the registration of the perforations in the cylinder and said member.

5. The combination, with a motor; and a cylinder having a foraminous end wall; of a foraminous cover therefor; and means for shifting said member to regulate the registration of the perforations in the cylinder and said member.

6. The combination, with a motor; and a cylinder having a foraminous end wall; of a rotatable disk, having perforations adapted to register with the perforations in said cylinder, and means for shifting said member to regulate the registration of the perforations in the cylinder and said member.

7. The combination, with a motor; and a cylinder having a foraminous end wall; of a rotatable disk, having perforations adapted to register with the perforations in said cylinder; and means for shifting said member to regulate the registration of the perforations in the cylinder and said member; and means for normally retaining said disk against the cylinder.

8. The combination, with a motor; and a cylinder having a foraminous end wall; of a rotatable disk, having perforations adapted to register with the perforations in said cylinder; means for shifting said disk to regulate the registration of the perforations in the cylinder and said disk; and a spring for normally retaining said disk against the cylinder.

EDMUND HUDSON.

Witnesses:
J. F. WINCH,
CHAS. F. SCHMELZ.